United States Patent
Sata

(10) Patent No.: US 10,696,214 B2
(45) Date of Patent: Jun. 30, 2020

(54) AUTOMATIC BRAKE LIGHT ACTIVATION SYSTEM

(71) Applicant: Toyota Motor Engineering & Manufacturing North America, Inc., Erlanger, KY (US)

(72) Inventor: Andrew G. Sata, Irvine, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 15/867,481

(22) Filed: Jan. 10, 2018

(65) Prior Publication Data

US 2019/0210516 A1    Jul. 11, 2019

(51) Int. Cl.
  *B60Q 1/44*     (2006.01)
  *G08G 1/0967*   (2006.01)
  *G08G 1/09*     (2006.01)

(52) U.S. Cl.
  CPC ............... *B60Q 1/44* (2013.01); *G08G 1/091* (2013.01); *G08G 1/096725* (2013.01); *G08G 1/096741* (2013.01); *G08G 1/096775* (2013.01)

(58) Field of Classification Search
  USPC .......................................................... 701/70
  See application file for complete search history.

(56) References Cited

U.S. PATENT DOCUMENTS

| | | |
|---|---|---|
| 3,332,060 A | 7/1967 | Liljequist |
| 4,418,331 A | 11/1983 | Chicoine |
| 5,461,362 A | 10/1995 | Echt |
| 6,020,814 A | 2/2000 | Robert |
| 6,023,221 A | 2/2000 | Michelotti |
| 6,525,652 B2 | 2/2003 | Smith |
| 6,587,573 B1 | 7/2003 | Stam et al. |
| 6,628,197 B1 | 9/2003 | Poguntke et al. |
| 7,170,402 B2 | 1/2007 | Bracken |
| 7,755,475 B2 | 7/2010 | Toelge et al. |
| 7,774,137 B2 | 8/2010 | Thorne |
| 8,482,397 B1 * | 7/2013 | Tajiri ....................... B60Q 1/44 340/441 |
| 8,655,543 B2 | 2/2014 | Tengler et al. |
| 2008/0238648 A1 * | 10/2008 | Tewari ................... B60Q 1/444 340/469 |

(Continued)

FOREIGN PATENT DOCUMENTS

DE    102010003331 A1 *   9/2011  .......... B60W 30/143

*Primary Examiner* — Lail A Kleinman
*Assistant Examiner* — Mahmoud M Kazimi
(74) *Attorney, Agent, or Firm* — Snell & Wilmer LLP

(57) ABSTRACT

Methods, systems, and apparatus for automatically activating brake lights for a vehicle. The system includes a brake pedal sensor for detecting whether a brake pedal is engaged. The system includes an accelerometer configured to detect whether the vehicle is decelerating and a magnitude of deceleration. The system includes an ECU configured to determine whether the magnitude of deceleration exceeds a deceleration threshold when deceleration of the vehicle is detected and when the brake pedal is not engaged. The system includes a brake light configured to be activated when the brake pedal is engaged or when the ECU determines the magnitude of deceleration exceeds the deceleration threshold when deceleration of the vehicle is detected and when the brake pedal is not engaged.

18 Claims, 5 Drawing Sheets

(56) References Cited

U.S. PATENT DOCUMENTS

2009/0261963 A1   10/2009  Ault
2013/0268162 A1*  10/2013  Ponziani ............... B60W 30/00
                                                      701/48
2015/0266414 A1*   9/2015  Bailey ...................... B60Q 1/44
                                                      340/467
2017/0368988 A1*  12/2017  Ault ....................... B60Q 1/448
2018/0251118 A1*   9/2018  Gaither ................. B60W 20/15

* cited by examiner

AUTOMATIC BRAKE LIGHT ACTIVATION SYSTEM

BACKGROUND

1. Field

This specification relates to a system and a method for automatically activating a brake light on a vehicle.

2. Description of the Related Art

A vehicle includes a brake light which is activated when the driver applies force to the brake pedal. The brake light conveys to drivers and individuals behind the vehicle that the driver of the vehicle is applying the brakes. For example, drivers of vehicles following behind a vehicle are made aware that the vehicle is slowing down when the vehicle's brake lights are activated. The drivers of the following vehicles may apply their brakes in response to the vehicle applying its brakes in order to avoid a collision.

However, there may be situations where a vehicle is slowing down, but the brake pedal is not engaged by the driver. In these situations, the driver of a following vehicle is not made aware of the slowing of the lead vehicle, and must rely on other observations, such as a closing of the following distance between the lead vehicle and the following vehicle, in order to determine that the lead vehicle is slowing down. It may take time for the driver of the following vehicle to make these observations, and by that time, it may be too late for the driver of the following vehicle to avoid a collision.

SUMMARY

What is described is an automatic brake light activation system for a vehicle. The system includes a brake pedal sensor configured to detect whether a brake pedal is engaged. The system also includes an accelerator pedal sensor configured to detect whether an accelerator pedal is engaged. The system also includes an accelerometer configured to detect whether the vehicle is decelerating and a magnitude of deceleration. The system also includes an electronic control unit (ECU) connected to the brake pedal sensor, the accelerator pedal sensor, and the accelerometer, and configured to determine whether the magnitude of deceleration exceeds a deceleration threshold when deceleration of the vehicle is detected, when the brake pedal is not engaged, and when the accelerator pedal is not engaged. The system also includes a brake light configured to be activated when the brake pedal is engaged or when the ECU determines the magnitude of deceleration exceeds the deceleration threshold when deceleration of the vehicle is detected, when the brake pedal is not engaged, and when the accelerator pedal is not engaged. In some embodiments, the brake light may be activated even when the accelerator pedal is engaged, if the magnitude of deceleration exceeds the deceleration threshold.

Also described is a method for automatically activating a brake light of a vehicle. The method includes detecting, by a brake pedal sensor, whether a brake pedal is engaged. The method also includes detecting, by an accelerator pedal sensor, whether an accelerator pedal is engaged. The method also includes detecting, by an accelerometer, whether the vehicle is decelerating. The method also includes detecting, by the accelerometer, a magnitude of deceleration when deceleration of the vehicle is detected. The method also includes determining, by an electronic control unit (ECU), whether the magnitude of deceleration exceeds a deceleration threshold when deceleration of the vehicle is detected, when the brake pedal is not engaged, and when the accelerator pedal is not engaged. The method also includes activating the brake light when the brake pedal is engaged or when the ECU determines the magnitude of deceleration exceeds the deceleration threshold when deceleration of the vehicle is detected, when the brake pedal is not engaged, and when the accelerator pedal is not engaged. In some embodiments, the brake light may be activated even when the accelerator pedal is engaged, if the magnitude of deceleration exceeds the deceleration threshold.

Also described is an automatic brake light activation system for a vehicle. The system includes a brake pedal sensor configured to detect whether a brake pedal is engaged. The system also includes an accelerator pedal sensor configured to detect whether an accelerator pedal is engaged. The system also includes a wheel rotation sensor configured to detect whether the vehicle is decelerating and a magnitude of deceleration. The system also includes an electronic control unit (ECU) connected to the brake pedal sensor, the accelerator pedal sensor, and the wheel rotation sensor, and configured to determine whether the magnitude of deceleration exceeds a deceleration threshold when deceleration of the vehicle is detected, when the brake pedal is not engaged, and when the accelerator pedal is not engaged. The system also includes a brake light configured to be activated when the brake pedal is engaged or when the ECU determines the magnitude of deceleration exceeds the deceleration threshold when deceleration of the vehicle is detected, when the brake pedal is not engaged, and when the accelerator pedal is not engaged. In some embodiments, the brake light may be activated even when the accelerator pedal is engaged, if the magnitude of deceleration exceeds the deceleration threshold.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for automatically activating a brake light of a vehicle. Conventional vehicles only activate the brake light of the vehicle when the driver engages the brake pedal. By engaging the brake pedal, the driver of the vehicle is able to slow down the vehicle, and the activation of the brake lights communicates to other following vehicles that the vehicle is slowing down. The following vehicles may also slow down in order to avoid a collision, or may change lanes.

In some situations, a vehicle may decelerate even though the driver does not engage the brake pedal. For example, the vehicle may decelerate when an incline is reached, or when engine braking occurs, or when regenerative braking is used. In these situations, with conventional brake light activation systems, the brake light does not light up despite a significant slowing down of the vehicle.

The driver of a following vehicle must determine that the lead vehicle is decelerating. The following driver may notice that the distance between the two vehicles is narrowing, and therefore may determine that the lead vehicle is decelerating. However, this determination by the following driver takes a certain amount of time, and the following driver is not as responsive to these types of changes as seeing an illumination of the brake lights of the lead vehicle. In some situations, a collision may occur if the following driver does not realize in sufficient time that the lead vehicle is decelerating.

The systems, vehicles, and methods described herein provide a more accurate indication of deceleration by a lead vehicle to one or more following vehicles or individuals. By providing a more accurate indication of deceleration, increased safety is achieved, as the following vehicles and individuals are able to respond to the lead vehicle's deceleration more promptly.

Figure 1A:
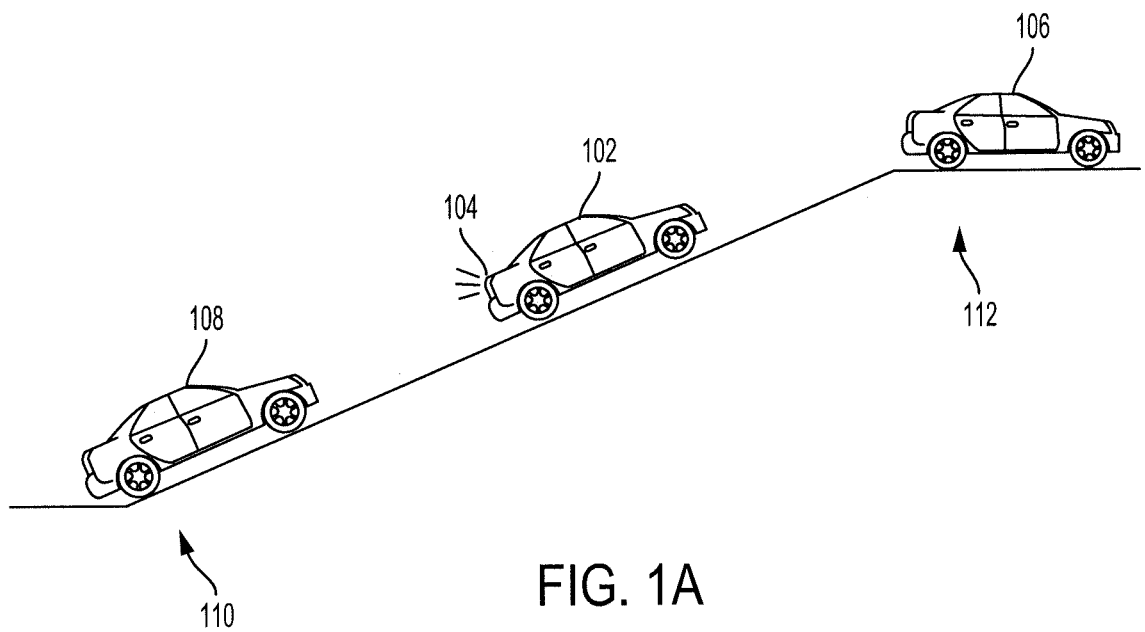
FIGS. 1A and 1B illustrate a vehicle using the automatic brake light activation system, according to various embodiments of the invention.

FIG. 1A illustrates an example scenario for the automatic brake light activation system. The vehicle 102, which may be referred to herein as the lead vehicle, is following behind a frontmost vehicle 106 and driving in front of a following vehicle 108. The vehicle 102 has followed the frontmost vehicle 106 up an inclined surface 110. The frontmost vehicle 106 is at a location 112 which has less of an incline than inclined surface 110.

The vehicle 102 was maintaining a constant vehicle speed until it reached the inclined surface 110, but did not maintain the vehicle speed as the vehicle 102 travelled up the inclined surface 110. The driver of vehicle 102 may not have engaged the accelerator pedal of vehicle 102, and relied on the momentum of the vehicle 102 to surmount the inclined surface 110. Accordingly, vehicle 102 has decelerated while on the inclined surface 110. The vehicle 102, anticipating arriving at location 112, which has less of an incline than inclined surface 110, may not engage the accelerator pedal until the vehicle 102 reaches location 112, or just before location 112. As a result, when conventional brake light activation systems are used, which rely on the brake pedal engagement as the only activator of the brake light, the brake light 104 of the vehicle 102 is not activated while the vehicle 102 traverses the inclined surface 110 and accordingly slows down.

When conventional brake light activation systems are used, despite the deceleration experienced by the vehicle 102, the brake lights 104 are not activated. As a result, the following vehicle 108 may be unaware that the vehicle 102 is decelerating. The following vehicle 108 may engage the accelerator pedal when on or approaching the inclined surface 110 in anticipation of the incline. However, as a result of the relative deceleration of the vehicle 102, the following vehicle 108 may have to suddenly engage the brake pedal to avoid colliding with the vehicle 102. Even if the following vehicle 108 manages to avoid colliding with the vehicle 102, the following vehicle 108 may be rear ended by another vehicle behind it.

When the systems and methods described herein are used, the vehicle 102 detects the deceleration from being on the inclined surface 110 and activates the brake light 104. Since the brake light 104 is activated, the following vehicle 108 is able to more quickly anticipate the slowing down of the vehicle 102 and avoid a collision or sudden braking.

In some situations, the driver of the vehicle 102 may be engaging the accelerator pedal when the vehicle 102 is on the inclined surface 110, but the vehicle 102 may still be decelerating if the acceleration of the vehicle 102 does not overcome the forces of gravity, drag, and/or friction when on the inclined surface 110. In some embodiments, the brake light 104 may not be activated, as the deceleration of the vehicle 102 may not be substantial enough to justify alerting the following vehicle 108. In some embodiments, the brake light 104 is not activated when the accelerator pedal is depressed or engaged. In other embodiments, the brake light 104 may be activated even when the accelerator pedal is engaged, as long as a detected deceleration exceeds a predetermined deceleration threshold. In some embodiments, the brake light 104 activation or deactivation is based on a comparison of a detected deceleration and the predetermined deceleration threshold.

Figure 1B:
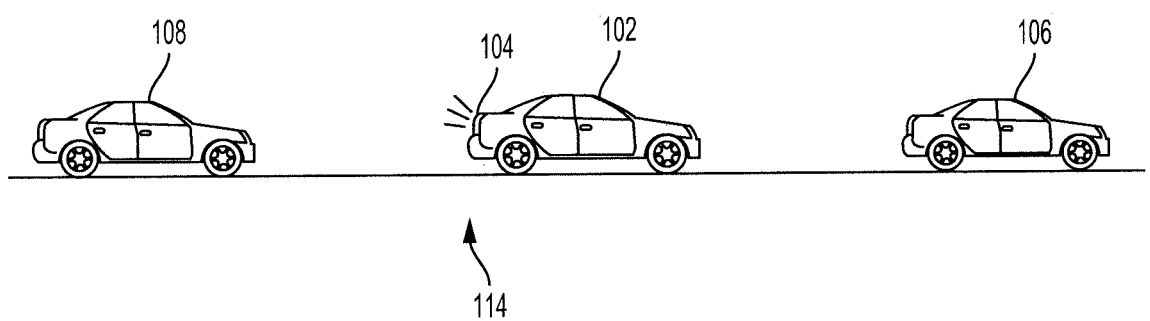

FIG. 1B illustrates another example scenario of the automatic brake light activation system. The vehicle 102 is travelling along a road 114 behind the frontmost vehicle 106. The vehicle 102 may be decelerating without engaging the brake pedal. In some situations, the vehicle 102 may be a hybrid vehicle which has a regenerative braking system. The regenerative braking system may cause the vehicle 102 to slow down, and the kinetic energy generated by the turning of the wheels during this deceleration may be used to charge a battery. In other situations, the vehicle 102 may experience drag from winds or from a slow driving surface. In yet other situations, the vehicle 102 may downshift transmission gears, resulting in pumping losses, which also slow down the vehicle 102. This is commonly referred to as engine braking.

In all of these situations, the vehicle 102 decelerates without the brake pedal being engaged. When the vehicle 102 uses conventional brake light activation systems, if the driver of the following vehicle 108 is not paying enough attention, the following vehicle 108 may collide with the vehicle 102. When the systems and methods described herein are used, the vehicle 102 will activate its brake lights 104, and the driver of the following vehicle 108 may be more promptly made aware that the vehicle 102 is decelerating.

In some situations, the vehicle 102 may make a turn while travelling at a sufficiently high velocity that the maneuver may not be safe. For example, when a vehicle travelling at 60 miles per hour makes a sharp turn, the vehicle may lose traction, causing it to slide, or the vehicle may even flip. In these situations, the brake lights 104 may be activated to alert following vehicles that the lead vehicle may potentially be in danger. In addition, the activated brake lights may signal to the following vehicles to slow down, if the following vehicles were maintaining a similar velocity to the lead vehicle as the turn was approached.

Figure 2:
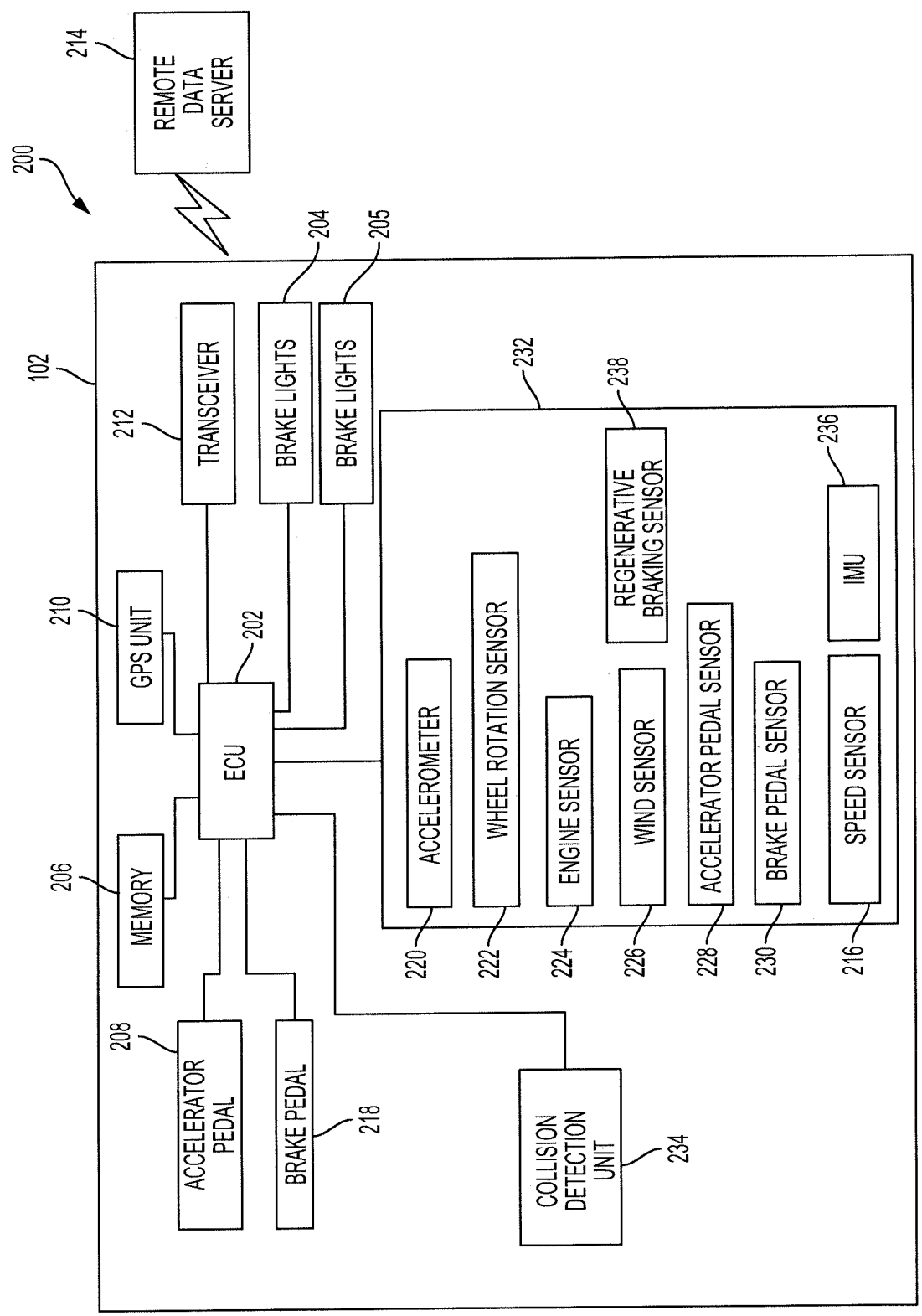
FIG. 2 illustrates an exemplary automatic brake light activation system, according to various embodiments of the invention.

FIG. 2 illustrates an exemplary automatic brake light activation system, according to various embodiments of the invention. The system 200 includes a vehicle 102. The vehicle 102 may be a fully electric vehicle, a partially electric vehicle, or a conventional vehicle powered by an internal combustion engine. The vehicle 102 may have an automatic or manual transmission. The vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor or battery driven vehicle. For example, the vehicle 102 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 102 may be a semi-autonomous vehicle or an autonomous vehicle. That is, the vehicle 102 may be self-maneuvering and navigate without human input. An autonomous vehicle may use one or more sensors and/or a navigation unit to drive autonomously.

The vehicle 102 may include one or more computers or electronic control units (ECUs) 202, appropriately programmed, to control one or more operations of the vehicle 102. The one or more ECUs 202 may be implemented as a single ECU or in multiple ECUs. The ECU 202 may be electrically coupled to some or all of the components of the vehicle 102. In some embodiments, the ECU 202 is a central ECU configured to control one or more operations of the entire vehicle 102. In some embodiments, the ECU 202 is multiple ECUs located across the vehicle 102 and each configured to control one or more local operations of the vehicle 102. In some embodiments, the ECU 202 is one or more computer processors or controllers configured to execute instructions stored in non-transitory memory 206.

The vehicle 102 includes a brake light 204, an accelerator pedal 208, and a brake pedal 218. The brake light 204 is configured to be activated when the brake pedal 218 is engaged and/or the vehicle 102 is decelerating. In one embodiment, the vehicle 102 includes two different independent brake lights 204 and 205. The first brake light 204 being activated when the brake pedal 218 is engaged or depressed and the second brake light 205 being activated when brake pedal 218 is not engaged or depressed but the vehicle 102 is decelerating or slowing down. The first brake light 204 and the second brake light 205 may have a different brightness to differentiate the two. The accelerator pedal 208 is configured to cause the vehicle 102 to be propelled by an engine or a motor.

The memory 206 is connected to the ECU 202 and may be connected to any other component of the vehicle 102. The memory 206 is configured to store any data described herein, such as a deceleration threshold and a vehicle speed threshold, and any data received from the remote data server 214 via the transceiver 212.

The vehicle 102 has a sensor panel 232. The sensor panel 232 includes an accelerometer 220, a wheel rotation sensor 222, an engine sensor 224, a wind sensor 226, an accelerator pedal sensor 228, a brake pedal sensor 230, a speed sensor 216, a regenerative braking sensor 238, and an inertial measurement unit (IMU) 236.

The accelerometer 220 is configured to detect an acceleration or a deceleration of the vehicle 102. The accelerometer 220 may be a part of the IMU 236, or may be a standalone accelerometer. In some embodiments, the wheel rotation sensor 222 is used as an alternative sensor for detecting acceleration or deceleration. The wheel rotation sensor 222 is configured to detect a speed of rotation of the wheels of the vehicle 102, and when the speed of rotation of the wheels of the vehicle 102 is increasing, the ECU 202 determines that the vehicle 102 is accelerating, and when the speed of rotation of the wheels of the vehicle 102 is decreasing, the ECU 202 determines that the vehicle 102 is decelerating. The ECU 202 can also determine that the vehicle 102 is accelerating or decelerating by taking a reading of the speedometer.

The engine sensor 224 is located in or near the engine and configured to detect one or more statuses of the operation of the engine. In some embodiments, the engine sensor 224 is able to detect whether the engine has a malfunction, and is also able to identify the type of malfunction. In some embodiments, the engine sensor 224 is located proximal to the throttle and able to detect a degree to which the throttle is open or closed to detect when pumping losses are present, such that engine braking can be detected or confirmed.

The wind sensor 226 is located on or near an exterior surface of the vehicle 102 and configured to detect a drag exerted on the vehicle due to wind. In some embodiments, the wind sensor 226 detects pressure or force of wind to determine drag.

The brake pedal sensor 230 is configured to measure an engagement of or an amount of pressure applied to the brake pedal 218. The accelerator pedal sensor 228 is configured to measure an engagement of or an amount of pressure applied to the accelerator pedal 208. The level of engagement may be expressed in terms of a value associated with the engagement, such as 2 for light engagement or 10 for heavy engagement of the accelerator pedal 208 or the brake pedal 218. The level of engagement may also be expressed in terms of a percentage depression of the accelerator pedal 208 or the brake pedal 218, such as 0% for no pedal engagement and 100% for maximum pedal engagement.

In some embodiments, the vehicle 102 is an autonomous vehicle, and in those embodiments, the brake pedal 218 and the accelerator pedal 208 are controlled by the ECU 202. Additionally, the brake pedal sensor 230 and the accelerator pedal sensor 228 may not be used, as the ECU 202 determines an amount of acceleration or braking to apply.

The speed sensor 216 (e.g., a speedometer) is configured to detect a speed of the vehicle 102. In some embodiments, the automatic brake light activation system is not used unless a minimum vehicle speed (e.g., 30 miles per hour) is achieved, as decelerations due to causes other than brake pedal engagement at low speeds may not require activation of the brake light. When driving in low speeds with frequent acceleration and deceleration, the automatic brake light activation system may activate the brake light too frequently, resulting in possible confusion of the driver of the following vehicle.

The regenerative braking sensor 238 is configured to detect when the regenerative braking system is being used. The regenerative braking sensor 238 may be a part of the ECU 202 when the ECU 202 is configured to determine when the regenerative braking system is used.

The IMU 236 is configured to detect an acceleration of the vehicle 102, a deceleration of the vehicle 102, an orientation in three dimensions of the vehicle 102, and whether an angular force is experienced by the vehicle 102, such as when the vehicle 102 makes a sharp turn.

The vehicle 102 also includes a collision detection unit 234. The collision detection unit 234 may use a network of spatial sensors to detect a possible collision between the vehicle 102 and a vehicle in front of the vehicle 102. In some embodiments, when the collision detection unit 234 detects a possible collision or an imminent collision with the vehicle in front of the vehicle 102, the collision detection unit 234 communicates an indication to the ECU 202, which then activates the brake lights 104.

The vehicle 102 may be coupled to a network. The network, such as a local area network (LAN), a wide area network (WAN), a cellular network, a digital short-range communication (DSRC), the Internet, or a combination thereof, connects the vehicle 102 to a remote data server 214. The remote data server 214 may be one or more servers from different service providers. Each of the one or more servers may be connected to one or more databases. A service provider may provide navigational map, weather and/or traffic data to the vehicle 102.

A database is any collection of pieces of information that is organized for search and retrieval, such as by a computer or a server, and the database may be organized in tables, schemas, queries, reports, or any other data structures. A database may use any number of database management systems and may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

The navigational map information includes political, roadway and construction information. The political information includes political features such as cities, states, zoning ordinances, laws and regulations, and traffic signs, such as a stop sign, or traffic signals. For example, laws and regulations may include the regulated speed on different portions of a road or noise ordinances. The roadway information includes road features such as the grade of an incline of a road, a terrain type of the road, or a curvature of the road. The construction information includes construction features such as construction zones and construction hazards.

The traffic data includes one or more traffic condition features, such as traffic congested areas or accident areas. The traffic data may provide information related to the density and movement of vehicles on a roadway and/or accident locations.

The features, e.g., road features, political features, or traffic data, each have a location that may be identified by map coordinates. The map coordinates may be defined by latitude and longitude coordinates.

The transceiver 212 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The transceiver 212 may transmit data to and receive data from devices and systems not directly connected to the vehicle 102. For example, the ECU 202 may communicate with the remote data server 214. Furthermore, the transceiver 212 may access the network, to which the remote data server 214 is also connected.

The GPS unit 210 is connected to the ECU 202 and configured to determine location data. The ECU 202 may use the location data along with the map data to determine a location of the vehicle 102. In other embodiments, the GPS unit 210 has access to the map data and may determine the location of the vehicle 102 and provide the location of the vehicle 102 to the ECU 202. As used herein, a unit may refer to hardware components, such as one or more computer processors, controllers, or computing devices configured to execute instructions stored in a non-transitory memory.

Figure 3A:
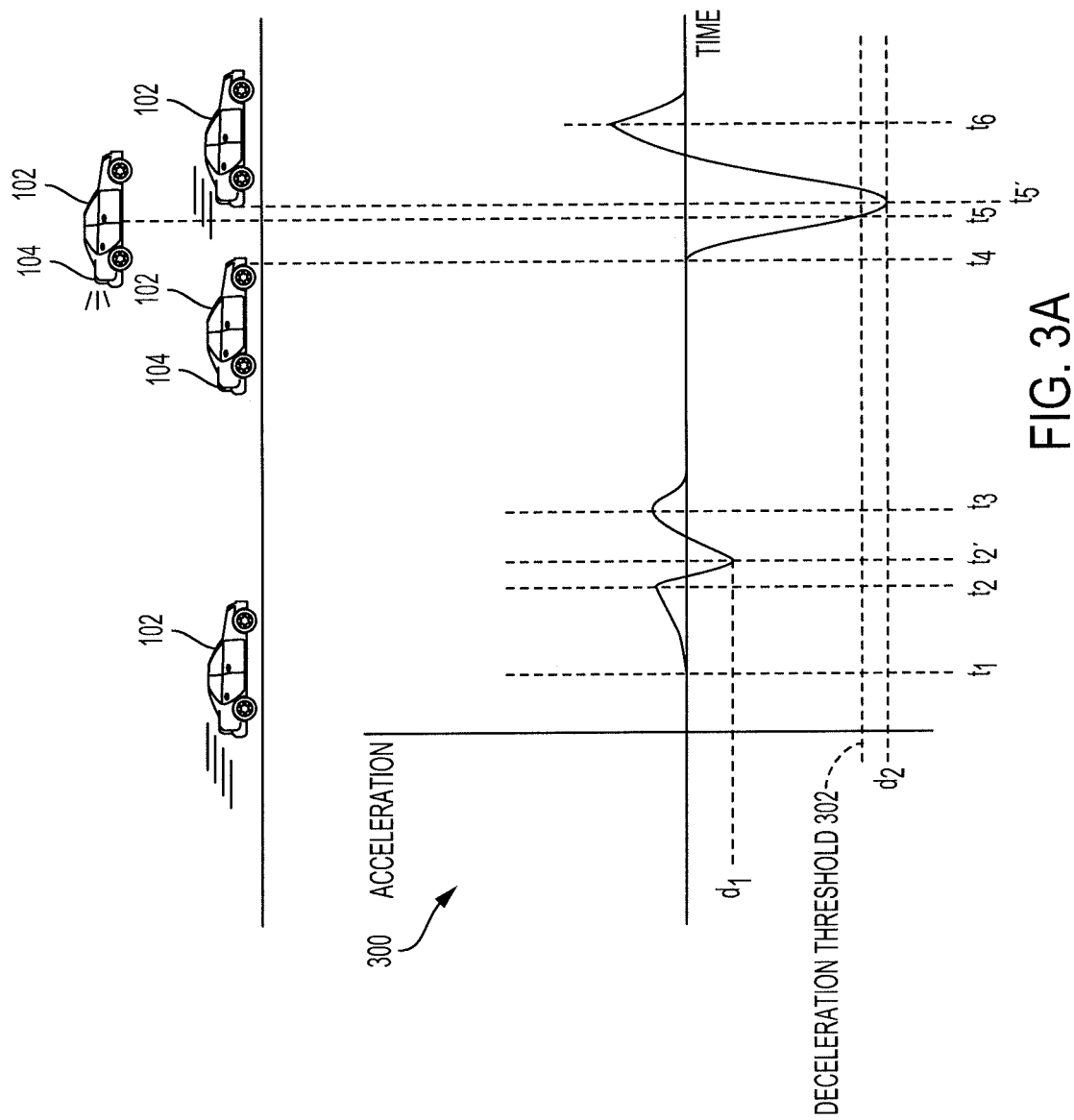
FIGS. 3A and 3B are graphs illustrating acceleration and deceleration of a vehicle and timing of the automatic brake light activation system in various scenarios, according to various embodiments of the invention.

FIG. 3A is a graph illustrating a vehicle using the automatic brake light activation system. The graph 300 shows the acceleration of the vehicle 102 on the vertical axis and time on the horizontal axis. The vehicle 102 is travelling on a flat surface and periodically engages the accelerator pedal 208 to maintain speed.

As shown in the graph 300, at time t1, the accelerator pedal 208 is engaged, and the vehicle 102 accelerates until time t2. At time t2, the accelerator pedal 208 is disengaged (i.e., the driver steps off of the accelerator pedal 208), and the vehicle 102 decelerates to a deceleration value d1. The acceleration or deceleration of the vehicle 102 may be measured by an accelerometer 220 or by a wheel rotation sensor 222, as described herein. At time t2', the accelerator pedal 208 is re-engaged and the vehicle 102 accelerates again until time t3.

From time t1 to t3, the brake pedal 218 of the vehicle 102 is not engaged, and accordingly the brake lights 104 are not activated from brake pedal engagement. In addition, the deceleration value d1 does not exceed the deceleration threshold 302. Accordingly, the brake lights 104 are not activated by the automatic brake light activation system. In this way, the automatic brake light activation system does not cause brake light activation in situations where it would be inappropriate to do so, even though the vehicle 102 did decelerate between t2 and t2'.

At time t4, the vehicle 102 experiences engine braking from downshifting transmission gears. The vehicle 102 decelerates, and at time t5, the deceleration of the vehicle 102 crosses the deceleration threshold 302. At time t5, the brake lights 104 are activated based on the deceleration of the vehicle 102 crossing the deceleration threshold 302. The vehicle 102 continues to decelerate until the accelerator pedal 208 is engaged at time t5'. At time t5', the brake light 104 is deactivated due to the accelerator pedal 208 being engaged, and the vehicle 102 accelerates until time t6.

Figure 3B:
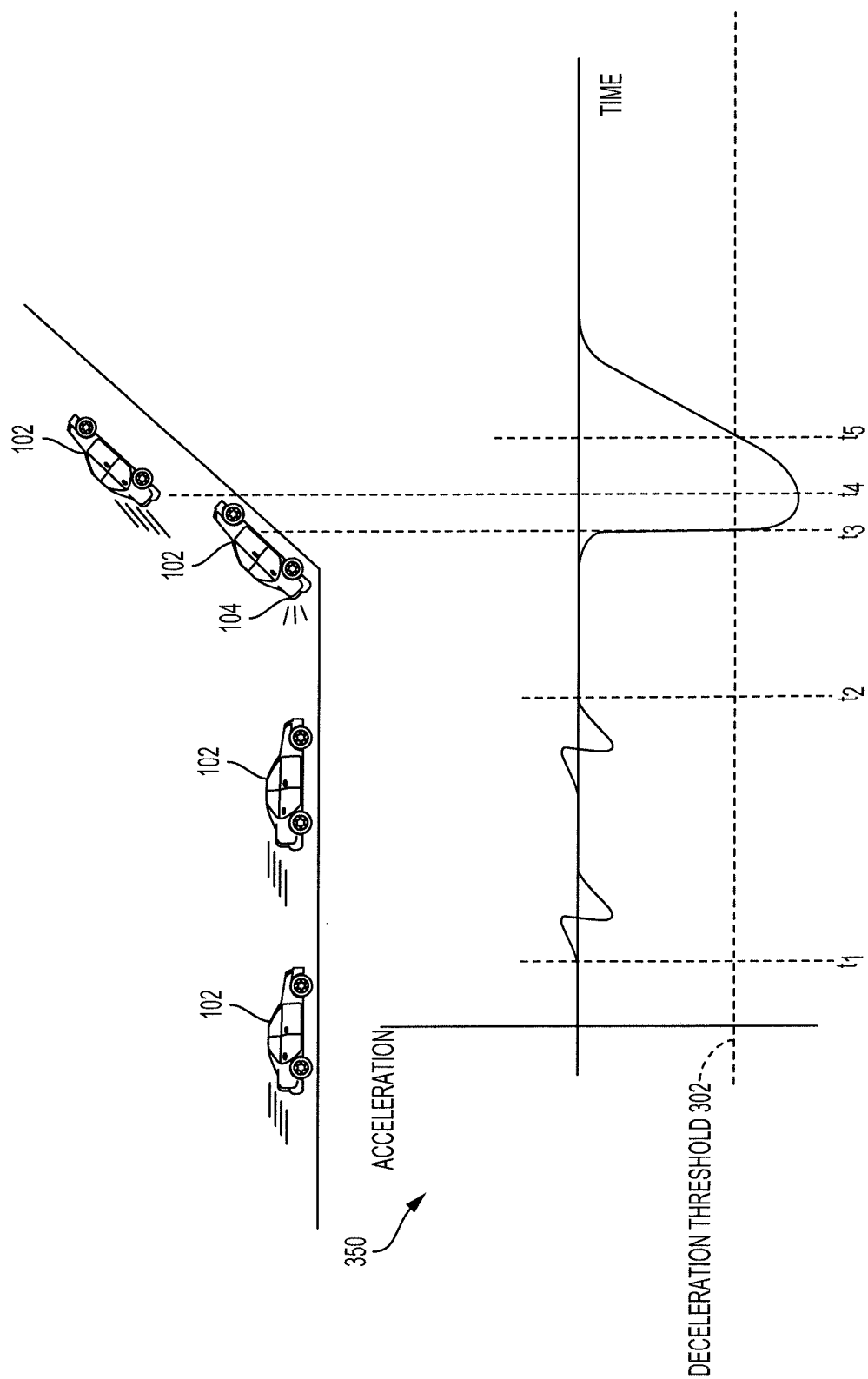

FIG. 3B is a graph illustrating an example situation of a vehicle using the automatic brake light activation system. The graph 350 shows the acceleration of the vehicle 102 on the vertical axis and time on the horizontal axis. The vehicle 102 is travelling on a flat surface and periodically engages the accelerator pedal 208 to maintain speed.

As shown in the graph 350, similar to the behavior shown in graph 300 of FIG. 3A, between times t1 and t2, the vehicle 102 maintains speed by engaging the accelerator pedal 208 to accelerate until particular time, disengaging the accelerator pedal 208, and re-engaging the accelerator pedal 208. The brake pedal 218 is not engaged and the deceleration does not exceed the deceleration threshold 302, so the brake lights 104 are not activated between times t1 and t2.

At time t3, the vehicle 102 encounters a steep incline and experiences a significant deceleration. The detected deceleration exceeds the deceleration threshold 302 at time t3, and accordingly the brake lights 104 are activated. The brake lights 104 are activated despite the brake pedal 218 not being engaged.

At time t4, the driver engages the accelerator pedal 208 to traverse the steep incline, and at time t4, the brake lights 104 are accordingly deactivated. The brake lights 104 are not activated despite the vehicle 102 being below the deceleration threshold 302 between times t4 and t5 because the accelerator pedal 208 is engaged, and the driver of vehicle 102 is propelling the vehicle 102 forward.

While an incline is shown in FIG. 3B, any other significant deceleration event may occur at time t3, causing the vehicle 102 to decelerate, such as engine braking (as shown in FIG. 3A) or regenerative braking.

The deceleration threshold 302 may change based on traffic data received from the remote data server 214. When traffic is present, the deceleration threshold 302 may be lowered (i.e., brought closer to zero) such that even a lesser deceleration activates the brake lights 104. In traffic, vehicles are located closer together and there is generally less following distance between vehicles, so even relatively small decelerations may cause a collision. When traffic is not present and/or when the vehicle 102 is travelling at high speeds, the deceleration threshold may be raised (i.e., brought further away from zero) such that a relatively large deceleration activates the brake lights 104 and smaller decelerations do not activate the brake lights 104 without the brake pedal 218 being engaged. When traffic is not present and/or when the vehicle 102 is travelling at high speeds, vehicles may be spread apart farther, and the vehicle 102 may rebound from the deceleration and regain speed before a following vehicle reaches it. In some embodiments, high speeds may be defined as vehicle speeds greater than 65 miles per hour. In some embodiments, traffic levels may be expressed as numbers on a scale (e.g., between 1 (no traffic) and 10 (lots of traffic)) or an average speed of a vehicle at a particular location, and each traffic level may have an associated deceleration threshold.

In some embodiments, the deceleration threshold may automatically change based on the detected speed of the vehicle 102 prior to the deceleration. For example, the deceleration threshold may increase (i.e., move away from zero) as the vehicle speed increases because the magnitude of deceleration from simply disengaging the accelerator pedal 208 may increase as the vehicle speed increases.

In some embodiments, the deceleration threshold may automatically change based on the detected location of the vehicle 102. The location data may be determined by the GPS unit 210 and received by the ECU 202. The deceleration threshold may decrease when the vehicle 102 is located at a location with terrain having slower associated driving speeds, such as unpaved roads or unmarked streets. The deceleration threshold may increase when the vehicle 102 is located at a location with terrain having faster associated driving speeds, such as a freeway or a highway.

In some embodiments, the deceleration threshold may be based on weather data received from the remote data server 214. The deceleration threshold may decrease when inclement weather is present, such as snow or rain. The deceleration threshold may increase in the presence of driving-favorable weather, such as a sunny day.

Any of the factors for determining the deceleration threshold (e.g., traffic data, speed data, location data, or weather data) may be considered alone or in combination to determine the deceleration threshold at a given time and place. Different factors may be assigned different weights in determining the deceleration threshold. The varying weights may be assigned by the owner of the vehicle, the operator of the vehicle, or the vehicle manufacturer.

Figure 4:
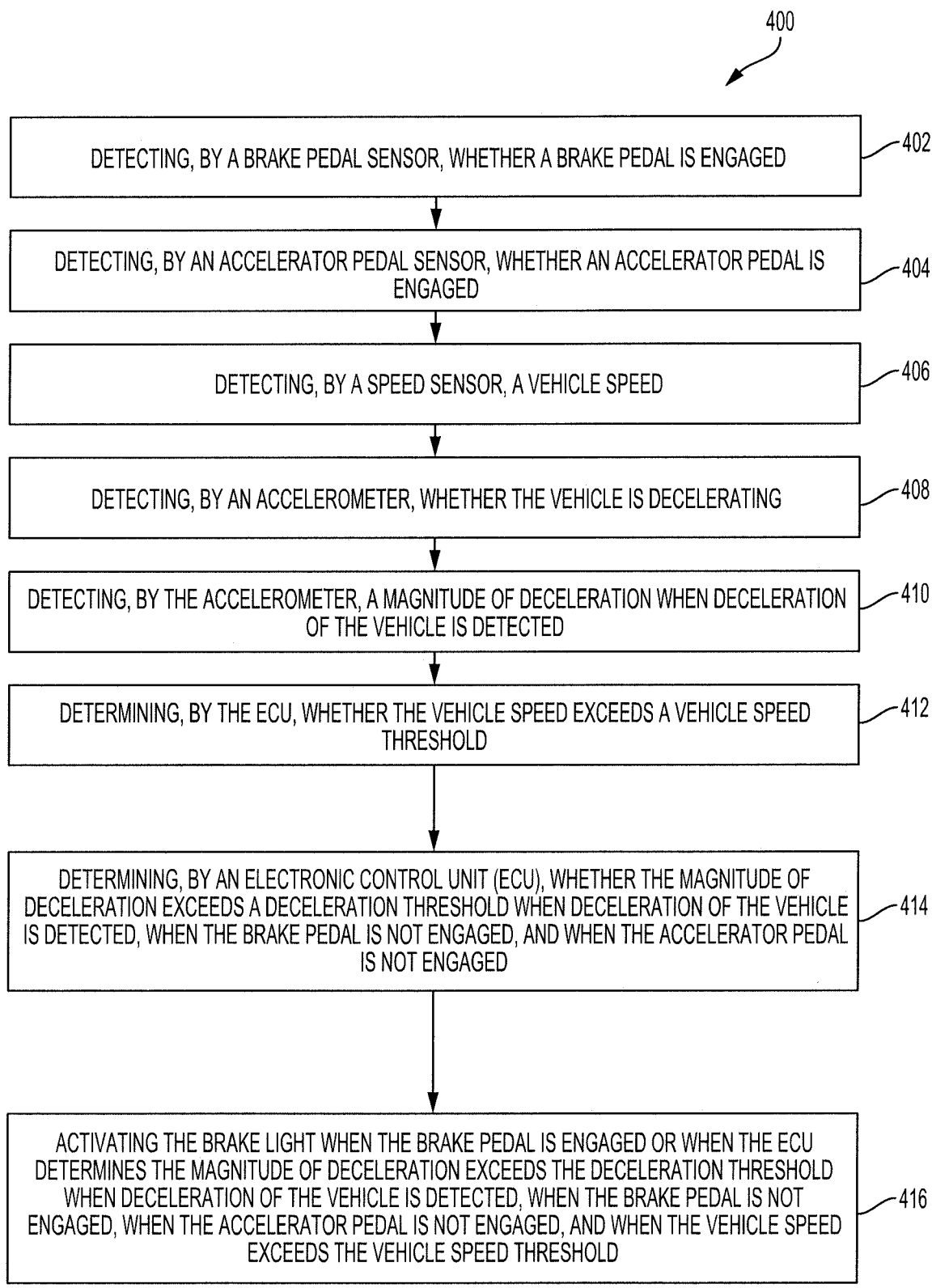
FIG. 4 illustrates a flow diagram of a process performed by the automatic brake light activation system, according to various embodiments of the invention.

FIG. 4 illustrates a flow diagram of a process 400 performed by the automatic brake light activation system. A brake pedal sensor 230 detects whether a brake pedal 218 is engaged (step 402). When the brake pedal 218 is engaged, the brake light 104 is activated. An accelerator pedal sensor 228 detects whether an accelerator pedal 208 is engaged (step 404). In some embodiments, when the accelerator pedal 208 is engaged, the brake light 104 is not activated. The brake light 104 may be activated even when the accelerator pedal 208 is engaged, for example, when the vehicle 102 is travelling up a hill but is decelerating. As described herein, when the vehicle 102 is an autonomous vehicle, the brake pedal 218 and accelerator pedal 208 may not be physical pedals, and may instead be instructions from the ECU 202 to the brakes and throttle, respectively.

A speed sensor 216 detects a vehicle speed (step 406). An accelerometer 220 detects whether the vehicle is decelerating (step 408) and a magnitude of deceleration when deceleration of the vehicle is detected (step 410).

The ECU 202 determines whether the vehicle speed detected by the speed sensor 216 exceeds a vehicle speed threshold (step 412). In some embodiments, when the vehicle speed does not exceed the vehicle speed threshold (e.g., 30 miles per hour), the brake light 104 is not automatically activated in any circumstance other than engagement of the brake pedal 218.

The ECU 202 determines whether the magnitude of deceleration detected by the accelerometer 220 exceeds a deceleration threshold (e.g., deceleration threshold 302) when the brake pedal 218 is not engaged, when the accelerator pedal 208 is not engaged, and/or when the vehicle speed exceeds the vehicle speed threshold (step 414). In other embodiments, the magnitude of deceleration is determined by the wheel rotation sensor 222.

The brake light 104 is activated when the brake pedal 218 is engaged or when the ECU 202 determines that the magnitude of deceleration exceeds the deceleration threshold when deceleration of the vehicle is detected, when the brake pedal 218 is not engaged, when the accelerator pedal 208 is not engaged, and/or when the vehicle speed exceeds the vehicle speed threshold (step 416).

In some embodiments, the IMU 236 detects an angular force on the vehicle 102. The angular force may be present when the vehicle 102 makes a turn. When the angular force detected by the IMU 236 exceeds a turn force threshold, the ECU 202 may activate the brake lights 104 to alert following vehicles that the vehicle 102 may be in a potentially dangerous situation.

In some embodiments, one or more sensors detect a cause of deceleration of the vehicle when the ECU 202 determines that the magnitude of deceleration exceeds the deceleration threshold in order to verify the deceleration of the vehicle 102. The sensor may be an engine sensor 224 configured to detect when engine braking is occurring. The sensor may be an inertial measurement unit 236 configured to detect when the vehicle 102 is in an inclined state. The sensor may be a regenerative braking sensor 238 configured to detect when regenerative braking is active. When the one or more sensors do not detect a respective cause of deceleration of the vehicle 102, the brake light 104 may not be activated. In some embodiments, hazard lights may be activated, when the one or more sensors detects a malfunction of one or more respective vehicle components, such as the engine, the transmission, or the brakes.

In some embodiments, when a collision detection unit 234 detects a potential collision or an imminent collision, the brake light 104 is activated. The collision detection unit 234 may use a system of spatial sensors and the ECU 202 to detect a potential collision or an imminent collision. By activating the brake light 104 in these situations, the following vehicles may be given earlier notice and subsequent collisions may be avoided. In some embodiments, the hazard lights are activated when the collision detection unit 234 detects a potential collision or an imminent collision.

In some embodiments, the deceleration threshold is adjusted based on a location of the vehicle detected by a GPS unit 210 and traffic data received by a transceiver 212 from a remote data server 214.

The various thresholds described herein may be calibrated and adjusted for each particular vehicle depending on its size and/or weight, for example. For example, a coupe will have different thresholds than a sport utility vehicle. The various thresholds may be initially determined by the vehicle manufacturer, and may be adjusted by the owner of the vehicle or the manufacturer of the vehicle based on modifications made to the vehicle (e.g., new tires, wheels, suspension, etc.).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An automatic brake light activation system for a vehicle, the system comprising:
   a brake pedal sensor configured to detect whether a brake pedal is engaged;
   an accelerator pedal sensor configured to detect whether an accelerator pedal is engaged;
   an accelerometer configured to detect whether the vehicle is decelerating and a magnitude of deceleration;
   a speed sensor configured to detect a current vehicle speed;
   a GPS unit configured to detect a location of the vehicle;
   an electronic control unit (ECU) connected to the brake pedal sensor, the accelerator pedal sensor, and the accelerometer, and configured to:
      automatically update a stored deceleration threshold based on the detected current vehicle speed and based on an environment associated with the location of the vehicle, and
      determine whether the magnitude of deceleration exceeds the updated deceleration threshold when deceleration of the vehicle is detected, when the brake pedal is not engaged, when the accelerator pedal is not engaged, and when the current vehicle speed exceeds a minimum vehicle speed threshold; and
   a brake light configured to be activated when the ECU determines the magnitude of deceleration exceeds the updated deceleration threshold when deceleration of the vehicle is detected, when the brake pedal is not engaged, when the accelerator pedal is not engaged, and when the current vehicle speed exceeds the minimum vehicle speed threshold.

2. The system of claim 1, further comprising a sensor connected to the ECU and configured to verify a cause of the deceleration of the vehicle, and
   wherein the brake light is configured to be activated when the ECU determines the magnitude of deceleration exceeds the updated deceleration threshold when deceleration of the vehicle is detected, when the brake pedal is not engaged, when the accelerator pedal is not engaged, when the current vehicle speed exceeds the minimum vehicle speed threshold, and when the cause of deceleration of the vehicle is verified.

3. The system of claim 2, wherein the cause of the deceleration of the vehicle is engine braking, and the sensor is an engine sensor configured to detect when engine braking is occurring.

4. The system of claim 2, wherein the cause of the deceleration of the vehicle is an inclined road, and the sensor is an inertial measurement unit configured to detect when the vehicle is inclined.

5. The system of claim 2, wherein the cause of the deceleration of the vehicle is regenerative braking, and the sensor is a regenerative braking sensor configured to detect when regenerative braking is active.

6. The system of claim 1, further comprising a pre-collision detection unit configured to anticipate a collision between the vehicle and another vehicle or object, and
   wherein the brake light is configured to be activated when the pre-collision detection unit anticipates the collision between the vehicle and the another vehicle or object.

7. The system of claim 1, further comprising a transceiver configured to receive traffic data from a remote data server,
   wherein the ECU is configured to further adjust the updated deceleration threshold based on the location of the vehicle and the traffic data.

8. A method for automatically activating a brake light of a vehicle, the method comprising:
   detecting, by a brake pedal sensor, whether a brake pedal is engaged;
   detecting, by an accelerator pedal sensor, whether an accelerator pedal is engaged;
   detecting, by an accelerometer, whether the vehicle is decelerating;
   detecting, by a speed sensor, a current vehicle speed;
   detecting, by a GPS unit, a location of the vehicle;
   detecting, by the accelerometer, a magnitude of deceleration when deceleration of the vehicle is detected;
   updating, by an electronic control unit (ECU), a stored deceleration threshold based on the detected current vehicle speed and an environment associated with the location of the vehicle;
   determining, by the ECU, whether the magnitude of deceleration exceeds the updated deceleration threshold when deceleration of the vehicle is detected, when the brake pedal is not engaged, and when the accelerator pedal is not engaged; and
   activating the brake light when the ECU determines the magnitude of deceleration exceeds the updated deceleration threshold when deceleration of the vehicle is detected, when the brake pedal is not engaged, and when the accelerator pedal is not engaged.

9. The method of claim 8, further comprising:
   determining, by the ECU, whether the current vehicle speed exceeds a minimum vehicle speed threshold; and
   activating the brake light when the ECU determines the magnitude of deceleration exceeds the deceleration threshold when deceleration of the vehicle is detected, when the brake pedal is not engaged, when the accelerator pedal is not engaged, and when the current vehicle speed exceeds the minimum vehicle speed threshold.

10. The method of claim 9, further comprising:
    verifying, by a sensor, a cause of the deceleration of the vehicle; and
    activating the brake light when the ECU determines the magnitude of deceleration exceeds the updated deceleration threshold when deceleration of the vehicle is detected, when the brake pedal is not engaged, when the accelerator pedal is not engaged, when the vehicle speed exceeds the minimum vehicle speed threshold, and when the cause of deceleration of the vehicle is verified.

11. The method of claim 10, wherein the cause of the deceleration of the vehicle is engine braking, and the sensor is an engine sensor configured to detect when engine braking is occurring.

12. The method of claim 10, wherein the cause of the deceleration of the vehicle is an inclined road, and the sensor is an inertial measurement unit configured to detect when the vehicle is inclined.

13. The method of claim 10, wherein the cause of the deceleration of the vehicle is regenerative braking, and the sensor is a regenerative braking sensor configured to detect when regenerative braking is active.

14. The method of claim 8, further comprising:
anticipating, by a pre-collision detection unit, a collision between the vehicle and another vehicle or object; and
activating the brake light when the pre-collision detection unit anticipates the collision between the vehicle and the another vehicle or object.

15. The method of claim 8, further comprising:
receiving, by a transceiver, traffic data from a remote data server; and
further adjusting, by the ECU the updated deceleration threshold based on the location of the vehicle and the traffic data.

16. An automatic brake light activation system for a vehicle, the system comprising:
a brake pedal sensor configured to detect whether a brake pedal is engaged;
an accelerator pedal sensor configured to detect whether an accelerator pedal is engaged;
a wheel rotation sensor configured to detect whether the vehicle is decelerating and a magnitude of deceleration;
a speed sensor configured to detect a current vehicle speed;
a GPS unit configured to detect a location of the vehicle;
an electronic control unit (ECU) connected to the brake pedal sensor, the accelerator pedal sensor, and the wheel rotation sensor, and configured to:
automatically determine a deceleration threshold based on the detected current vehicle speed and based on an environment associated with the location of the vehicle, and
determine whether the magnitude of deceleration exceeds the deceleration threshold when deceleration of the vehicle is detected, when the brake pedal is not engaged, when the accelerator pedal is not engaged, and when the current vehicle speed exceeds a minimum vehicle speed threshold; and
a brake light configured to be activated when the ECU determines the magnitude of deceleration exceeds the deceleration threshold when deceleration of the vehicle is detected, when the brake pedal is not engaged, when the accelerator pedal is not engaged, and when the vehicle speed exceeds the vehicle speed threshold.

17. The system of claim 16, further comprising a sensor connected to the ECU and configured to verify a cause of the deceleration of the vehicle, and
wherein the brake light is configured to be activated when the ECU determines the magnitude of deceleration exceeds the deceleration threshold when deceleration of the vehicle is detected, when the brake pedal is not engaged, when the accelerator pedal is not engaged, when the vehicle speed exceeds the minimum vehicle speed threshold, and when the cause of deceleration of the vehicle is verified.

18. The system of claim 16, further comprising a pre-collision detection unit configured to anticipate a collision between the vehicle and another vehicle or object, and
wherein the brake light is configured to be activated when the pre-collision detection unit anticipates the collision between the vehicle and the another vehicle or object.

* * * * *